US012003639B2

(12) United States Patent
Chen et al.

(10) Patent No.: US 12,003,639 B2
(45) Date of Patent: Jun. 4, 2024

(54) TECHNIQUES FOR SHARING SECURE COMMUNICATION SESSIONS WITHIN A COMPUTER NETWORK

(71) Applicant: NETFLIX, INC., Los Gatos, CA (US)

(72) Inventors: Andrew Chen, Sunnyvale, CA (US); Jonathan T. Looney, Syracuse, NY (US)

(73) Assignee: NETFLIX, INC., Los Gatos, CA (US)

( * ) Notice: Subject to any disclaimer, the term of this patent is extended or adjusted under 35 U.S.C. 154(b) by 107 days.

(21) Appl. No.: 17/071,978

(22) Filed: Oct. 15, 2020

(65) Prior Publication Data

US 2022/0123934 A1    Apr. 21, 2022

(51) Int. Cl.
*H04L 9/32*     (2006.01)
*H04L 9/08*     (2006.01)
*H04L 9/40*     (2022.01)

(52) U.S. Cl.
CPC .......... *H04L 9/3213* (2013.01); *H04L 9/0819* (2013.01); *H04L 9/085* (2013.01); *H04L 63/0428* (2013.01); *H04L 63/166* (2013.01)

(58) Field of Classification Search
CPC ..... H04L 9/3213; H04L 9/0819; H04L 9/085; H04L 63/0428; H04L 63/166
USPC ....................................................... 713/155
See application file for complete search history.

(56) References Cited

U.S. PATENT DOCUMENTS

| 10,193,934 | B2* | 1/2019 | Skuratovich | H04L 65/762 |
| 2005/0091171 | A1* | 4/2005 | Grobman | H04L 63/0823 705/64 |
| 2005/0198380 | A1* | 9/2005 | Panasyuk | H04L 63/0272 709/239 |
| 2013/0198509 | A1* | 8/2013 | Buruganahalli | H04L 63/1408 713/151 |
| 2019/0182349 | A1* | 6/2019 | Goel | H04L 67/55 |
| 2019/0356736 | A1* | 11/2019 | Narayanaswamy | H04L 49/10 |
| 2022/0085976 | A1* | 3/2022 | Fan | H04L 63/0807 |

OTHER PUBLICATIONS

International Search Report for application No. PCT/US2021/055033 dated Jan. 20, 2022.

* cited by examiner

*Primary Examiner* — Sanchit K Sarker
(74) *Attorney, Agent, or Firm* — Artegis Law Group, LLP

(57) ABSTRACT

In various embodiments, servers in a server pool share a centrally-generated encryption key that is used to encrypt session keys in tickets that can be used by client applications to share secure communication sessions across different servers belonging to the same server pools. When the client application first establishes a secure communication session with a server in a server pool, the server returns a ticket that includes an encrypted version of a session key generated using an encryption key shared by servers in the server pool. Thereafter, the client application can present the ticket to other servers in the server pool to restore the secure communication session with the other servers. Associations between servers and server pools can be communicated to the client application in any technically feasible manner, such as part of information indicating servers from which content can be accessed or via the Domain Name System (DNS).

20 Claims, 8 Drawing Sheets

TECHNIQUES FOR SHARING SECURE COMMUNICATION SESSIONS WITHIN A COMPUTER NETWORK

BACKGROUND

Field of the Invention

Embodiments of the present disclosure relate generally to computer science and networking and, more specifically, to sharing secure communication sessions within a computer network.

Description of the Related Art

Secure communication protocols, such as Transport Layer Security (TLS), are commonly used to secure communications over computer networks. Typically, secure communication sessions, such as TLS sessions, are initiated with a "handshake." During the handshake, a client application and a server first verify each other and then negotiate a session encryption key (also referred to herein as a "session key") that is used to encrypt and decrypt communications between the client application and the server during a session. Any entity, such as a malicious actor, that does not possess the session key is not able to decrypt communications between the client application and the server during the session.

The handshakes used to initiate secure communication sessions can be expensive, both computationally and in terms of the amount of time required to perform the handshakes. To avoid expensive handshakes, some secure communications protocols permit a server to encrypt session keys and other information associated with a session using another encryption key that is maintained by that server. The encrypted session key and other information are then returned to the client application as a "ticket" (also referred to herein as a "session ticket"), which the client application can present to the server at a later point in time to resume the secure communication session with the given server, without having to perform a new handshake. For example, in TLS, a ticket is a "blob" of data that is opaque to the client application and includes an encrypted session key along with other session information. The blob can be decrypted by the server that initially encrypted the blob using the same encryption key. The decrypted information can then be used to rebuild a session-specific state for a previously-generated secure communication session between the client application and the given server, which enables the secure communication session to be automatically resumed without having to perform another handshake.

One drawback of the above approach is that secure communication sessions can only be resumed between the client application and the same given server. However, web services oftentimes are provided through multiple servers rather than a single server. In such cases, a client application must perform a separate handshake with each server to establish the necessary sessions across the different servers to access the relevant web service. A session established with one server cannot be shared with or restored on another server. As noted above, performing multiple handshakes with different servers can be computationally expensive and require significant amounts of time.

As the foregoing illustrates, what is needed in the art are more effective techniques for establishing secure communication sessions within a computer network.

SUMMARY OF THE EMBODIMENTS

One embodiment of the present disclosure sets forth a computer-implemented method for sharing secure communication sessions within a computer network. The method includes receiving a first ticket from a first server that is included in a first server pool and with which a first secure communication session has been established. The method further includes receiving information indicating that a second server also is included in the first server pool and is associated with a first address. In addition, the method includes establishing a connection with the second server based on the first address, and restoring the first secure communication session with the second server based on the first ticket.

Another embodiment of the present disclosure sets forth a computer-implemented method. The method includes storing associations between servers and server pools, wherein servers in each server pool share an encryption key that is used to encrypt session keys. The method further includes transmitting, to a client application, information indicating an address of a first server from which content can be accessed and a first server pool associated with the first server.

Another embodiment of the present disclosure sets forth a system. The system includes a memory storing a client application. The system further includes a processor that is coupled to the memory and, when executing the client application, is configured to perform the steps of: receiving a ticket from a first server that is included in a server pool and with which a secure communication session has been established, receiving information indicating that a second server also is included in the server pool and is associated with an address, establishing a connection with the second server based on the address, and restoring the secure communication session with the second server based on the ticket.

At least one technical advantage of the disclosed techniques relative to the prior art is that multiple handshakes are not required to establish secure communication sessions with servers in a server pool. As a result, the computational expense and time generally associated with handshakes can be avoided when accessing content stored across a server pool. Further, different shared encryption keys can be generated for different server pools so that, even if the shared encryption key for one server pool is compromised, the compromised shared encryption key cannot be used to decrypt data handled by other server pools. In addition, the servers in different server pools can use shared encryption keys having different expiration times, which provides resiliency by ensuring that encryption keys do not expire across all server pools at the same time in cases when key rotation fails and enables the failure to be remedied before the encryption keys do all expire. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
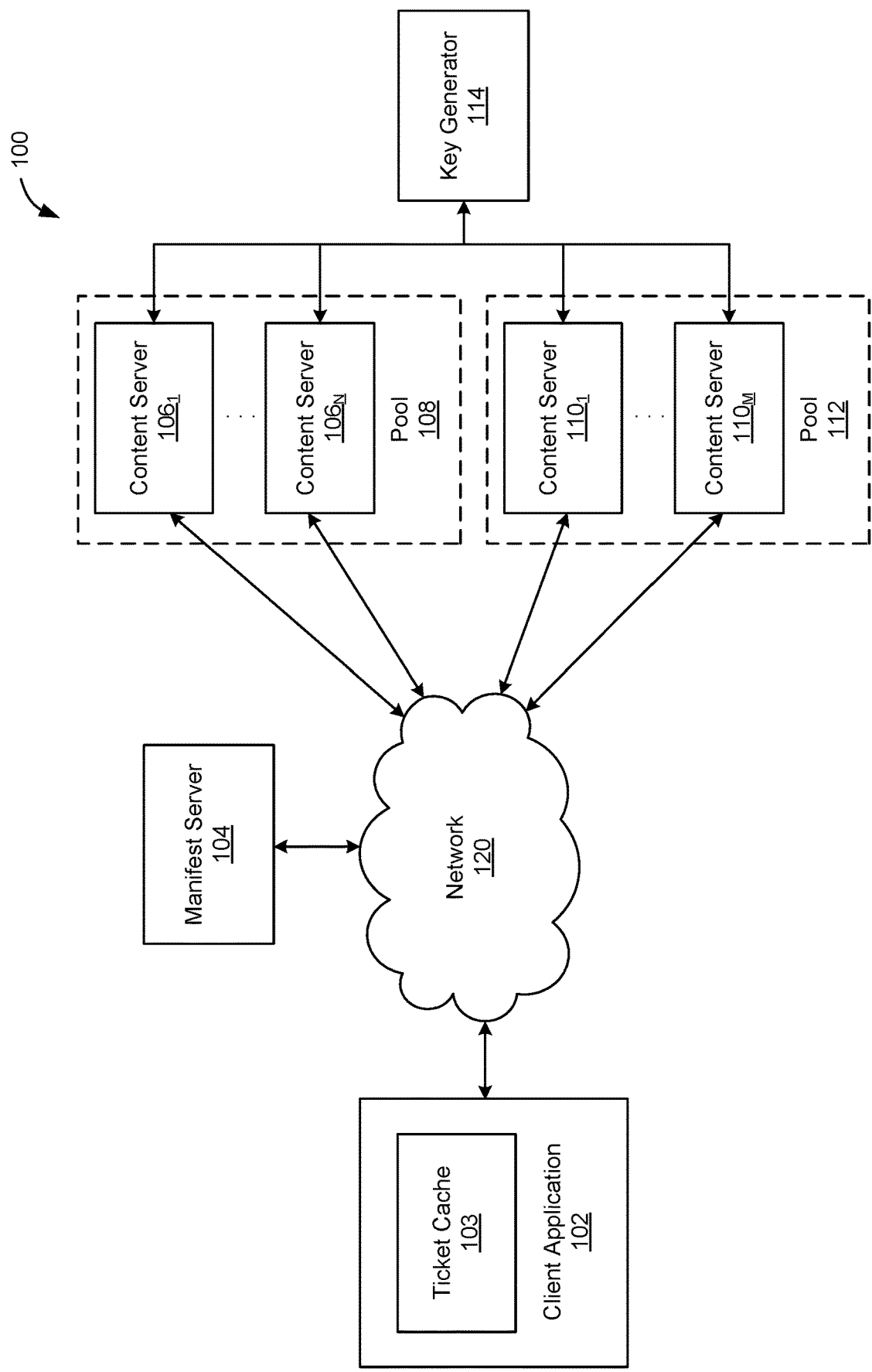
FIG. 1 is a conceptual illustration of a system that is configured to implement one or more aspects of the various embodiments.

In the following description, numerous specific details are set forth to provide a more thorough understanding of the present disclosure. However, it will be apparent to one skilled in the art that the present disclosure may be practiced without one or more of these specific details.

As described, conventional approaches for resuming secure communication sessions only permit sessions to be resumed with the same server. Oftentimes, web services are provided by multiple servers rather than a single server. In such cases, a client application must perform a separate handshake to establish a secure communication session with each of the multiple servers, which can be computationally expensive and require a significant amount of time.

The disclosed techniques permit secure communication sessions to be shared across multiple servers belonging to a server pool. In the disclosed techniques, the servers in a server pool share a centrally-generated encryption key that is used to encrypt session keys in tickets that are returned to client applications. The shared encryption key (which is also referred to herein as a "pool encryption key") is associated with a first time period during which the shared encryption key can be used to both encrypt and decrypt session keys, as well as a longer time period during which the shared encryption key can be used only to decrypt (but not to encrypt) session keys. In some embodiments, the shared encryption keys generated for a server pool have staggered expiration times, such that a next shared encryption key can be used to encrypt tickets after a previous shared encryption key expires. The staggered expiration times of shared encryption keys is also referred to herein as a "waterfall scheme." In some embodiments, the shared encryption keys for different server pools (e.g., server pools at different geographical locations) can be valid for different periods of time.

When a client application first establishes a secure communication session with a server belonging to a particular server pool, the server returns a ticket that includes an encrypted version of a session key generated using a shared encryption key for the server pool. The client application stores the ticket and an association between the server pool and the ticket in a cache. Prior to an expiration of the ticket, the client application can retrieve the ticket from the cache and present the ticket to another server in the same server pool to restore the secure communication session with the other server. The associations between servers and server pools can be communicated to the client application in any technically feasible manner, such as part of information indicating servers from which content can be accessed or via the Domain Name System (DNS).

Advantageously, the disclosed techniques address various limitations of conventional approaches for resuming secure communication sessions. The disclosed techniques do not require multiple handshakes to establish secure communication sessions with servers in a server pool. As a result, the computational expense and time generally associated with handshakes can be avoided when accessing content stored across a server pool. Further, different shared encryption keys can be generated for different server pools so that, even if the shared encryption key for one server pool is compromised, the compromised shared encryption key cannot be used to decrypt data handled by other server pools. In addition, the shared encryption keys for different server pools can have different expiration times, which provides resiliency by ensuring that the shared encryption keys do not expire across all server pools at the same time in cases when key rotation fails and enables such a failure to be remedied before the shared encryption keys do all expire.

System Overview

FIG. 1 is a conceptual illustration of a system 100 that is configured to implement one or more aspects of the various embodiments. As shown, the system 100 includes a client application 102, a manifest server 104, and pools 108 and 112 of content servers $106_{1-N}$ (collectively referred to as content servers 106 and individually referred to as a content server 106) and $110_{1-M}$ (collectively referred to as content servers 110 and individually referred to as a content server 110), respectively, that communicate over a network 120, such as the Internet. In addition, the system 100 includes a key generator 114 that is in communication with the content servers 106 and 110.

The content servers 106 and 110 serve data associated with content to client applications, such as the client application 102. For example, a streaming video service could include content servers that serve video, audio, and subtitle data. More generally, the content servers 106 and 110 can serve any suitable data to client applications. In some embodiments, each of the content servers 106 and 110 can store different content data. In other embodiments, one or more of the content servers can store the same content data. Although described herein primarily with respect to content servers 106 and 110, techniques disclosed herein are also applicable to other types of servers.

The client application 102 can be a web browser or any other technically feasible software application that is capable of accessing content stored on the content servers 106 (and/or other servers). For example, the client application 102 could be a dedicated application for browsing and watching streaming videos.

The manifest server 104 stores information indicating which content server(s) 106 and 110 the client application 102 should communicate with to access various content data stored on the content servers 106 and 110, as well as server pools to which those content servers 106 and 110 belong. Returning to the streaming video example, the video, audio, and subtitle data associated with videos could be stored across different content servers 106 and 110. As another example, different content servers 106 and 110 could store video data that is encoded differently (e.g., at different bit rates). In such cases, the manifest server 104 can maintain information (e.g., metadata) indicating where video, audio, and subtitle data is stored across the content servers 106 and 110. In addition, the manifest server 104 can provide, to the client application 102, information relating to content servers 106 and/or 110 where data for particular videos can be accessed, including the addresses of those content servers 106 and/or 110 and identifiers (IDs) of server pools to which the content servers 106 and/or 110 belong. The addresses of the content server 106 and/or 110 can include web addresses, also referred to as uniform resource locators (URLs), Internet Protocol (IP) addresses, or the like. Such information indicating where data relating to particular content can be accessed on the content servers 106 and/or 110 is also referred to herein as a "manifest."

In some embodiments, the client application 102 requests, in response to user input, the information relating to content servers 106 from which particular content can be accessed. Returning to the streaming video example, a user may select to watch a particular video, in which case the client application 102 could request from the manifest server 104 information relating to content servers 106 from which data (e.g., video, audio, subtitles) for the selected video can be accessed.

In some embodiments, the client application 102 can also use predictive technique(s) to automatically determine that a user is likely to request content from certain content server(s), and request information relating to those content server(s). Any technically feasible predictive technique(s) (e.g., machine learning techniques) may be employed. For example, the client application 102 could perform prefetching in which the client application 102 determines particular video(s) that a user is likely to select when the client application 102 is started, as well as the content servers 106 and/or 110 on which data associated with those video(s) are stored.

In response to the request from the client application 102 the manifest server 104 transmits, to the client application 102, content server information including addresses of content servers 106 and/or 110 and IDs of server pools to which those content servers belong. In alternative embodiments, anycast may be employed, in which a single hostname points to multiple content servers that belong to a content server pool. In such cases, information indicating the server pools to which the content servers 106 and/or 110 belong may not be transmitted to the client application 102, which may even be unaware that the server pools exist. It should be understood that the client application 102 in such cases is unable to select particular content servers based on, e.g., geographical location. Instead, particular content servers can be selected by DNS, which processes the anycast requests. In some embodiments, a pool of servers can be associated with a single DNS entry, but anycast may not be used (i.e., anycast is optional). By contrast, in embodiments in which the manifest server 104 transmits information indicating the server pools to which content servers belong, the client application 102 can select and communicate with particular content servers via unicast. It should be understood that the client application 102 in some embodiments may select servers belonging to server pools for which pool encryption keys have been cached, because secure communication sessions can be restored relatively quickly with those servers. Although described herein primarily with respect to the manifest server 104 transmitting information indicating the server pools to which content servers belong, in other embodiments, such information can be transmitted to the client application 102 in any technically feasible manner, such as via DNS.

In some embodiments, the client application 102 receives manifests including addresses of content servers 106 and/or 110 from which data relating to content can be accessed, and server pools to which those content servers 106 and/or 110 belong. The client application 102 can use such addresses to communicate with the content servers 106 and/or 110. In addition, the client application 102 can use stored session tickets to restore sessions with content servers 106 and/or 110 belonging to server pools associated with the stored session tickets. As shown, the client application 102 includes a ticket cache 103 that stores session tickets and associations between session tickets and server pools. In some embodiments, IDs of the server pools are used as keys into the ticket cache 103.

For explanatory purposes only, one client application 102, one manifest server 104, two pools 108 and 112 of content servers 106 and 110, and one key generator 114 are shown in FIG. 1. However, as persons skilled in the art will recognize, the system 100 may generally include any number of client applications, and each of the client application 102, the manifest server 104, the content servers 106 and 110, and the key generator 114, may run on one or more physical computing systems or virtual computing systems running in, e.g., a data center or cloud. Further, functionality of the client application 102, the manifest server 104, the content servers 106 and 110, and the key generator 114 may be distributed across any number of other computing devices, or functionality of any number of applications may be consolidated into a single application or subsystem.

Figure 2:
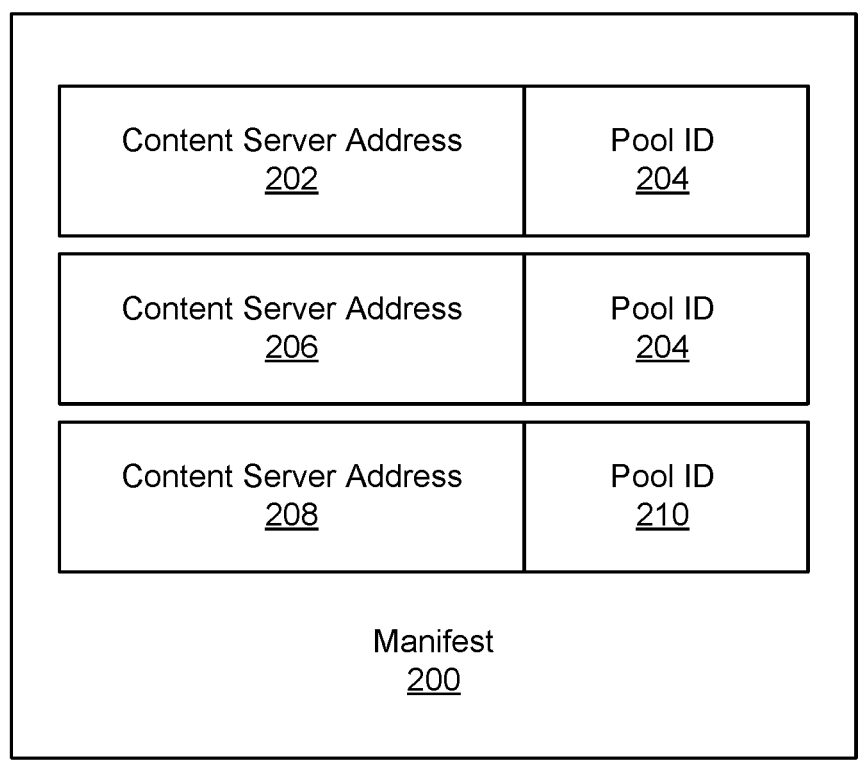
FIG. 2 is a conceptual illustration of a manifest that can be generated by the manifest server of FIG. 1, according to various embodiments.

FIG. 2 is a conceptual illustration of a manifest 200 that can be generated by the manifest server 104 of FIG. 1, according to various embodiments. As shown, the manifest 200 includes information relating to content servers (e.g., one or more of the contents servers 106 or 110) from which particular content can be downloaded by the client application 102. Returning to the video streaming example, the particular content could be a video that a user has selected to watch or is likely to select to watch, as determined via predictive algorithm(s). In such a case, the video, audio, and subtitle data that is associated with the video and applicable to a client device on which the client application 102 is running, could be stored across multiple content servers. For example, different content servers could store video data encoded at different bit rates or subtitles in different languages.

Illustratively, the manifest server 104 generates the manifest 200 to include content server addresses 202, 206, and 208 from which particular content can be downloaded by the client application 102, as well as pool identifiers (IDs) 204 and 210 indicating the server pools to which those content servers belong. In some embodiments, the content server addresses 202, 206, and 208 included in the manifest 200 may be associated with content servers that host content specific to a client device on which the client application 102 runs. For example, one or more of the content servers could store videos having a particular resolution that can be played back on the client device. Although not shown, the manifest 200 can also include other suitable information, such as information specifying the content data (e.g., video, audio, and/or subtitles) stored on particular content servers.

Upon receiving the manifest 200, the client application 102 can use a session ticket that is received from a content server 106 or 110 after performing a handshake, and is stored in the ticket cache 103, to restore a session with another content server 106 or 110 that belongs to the same server pool 108 or 112. In particular, the client application 102 can present the session ticket to the other content server, which can decrypt the session ticket using the pool encryption key that was used to encrypt the session key. The decrypted information can then be used to rebuild a session-specific state for a previously-generated secure communication session. Doing so restores the previous session that was initiated with a secure communication handshake, without requiring the handshake to be performed again. If, however, a session ticket associated with the pool ID 204 or 210 is not stored in the ticket cache 103, then the client application 102 must perform another secure communication handshake with the content server 106 or 110 to initiate a new session. Such a content server can then (1) generate a ticket for the new session by encrypting a session key (and other information needed to restore the session) using a pool encryption key received from the key generator 114, and (2) transmit the session ticket to the client application 102. In turn, the client application 102 can store the session ticket in the ticket cache 103 for future use with the same content server and/or other content servers belonging to the same server pool.

Figure 3:
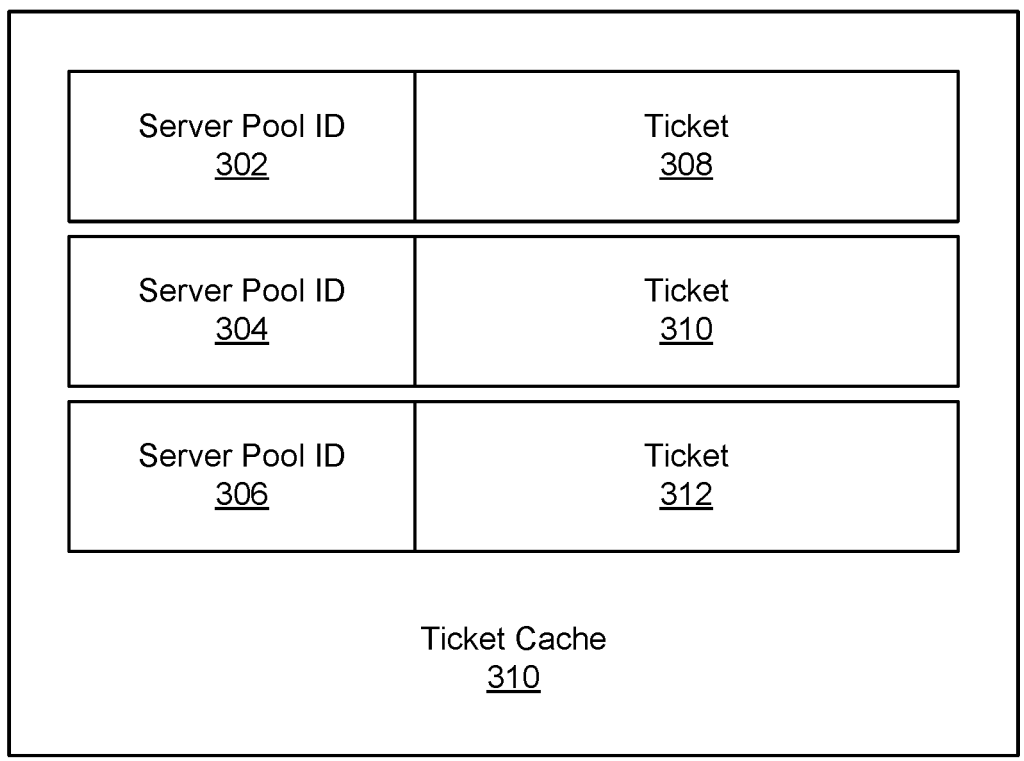
FIG. 3 illustrates in greater detail the ticket cache in the client application of FIG. 1, according to various embodiments.

FIG. 3 illustrates in greater detail the ticket cache 310 in the client application 102 of FIG. 1, according to various embodiments. As described, the ticket cache 103 is used by the client application 102 to store session tickets for different content server pools. Illustratively, the ID of server pools 302, 304, and 306 are used as keys into the ticket cache 103. In some embodiments, the ticket cache 103 can be a database. As shown in FIG. 3, multiple session tickets 308, 310, and 312 are stored, along with associated server pool IDs 302, 304, and 306, respectively. Although three session tickets 308, 310, and 312 are shown for illustrative purposes, the ticket cache 310 can generally store any number of session tickets and associated server pool IDs. It should be noted that the associations between servers and server pools do not need to be stored in the ticket cache 310 (although the associations could also be cached), because such associations are transmitted by the manifest server 104 to the client application 102 in response to requests from the client application 102 for information relating to content servers from which data for particular content can be accessed.

As described, the server pool IDs 302, 304, and 306 are keys that can be used to retrieve the session tickets 308, 310, and 312 from the ticket cache 310. In some embodiments, the session tickets 308, 310, and 312 expire at the same time that the server pool encryption keys used to generate those session tickets expire and can no longer be used for encryption or decryption. As described, different server pools can also be associated with different pool encryption keys, and the pool encryption keys can expire in a staggered manner. As a result, even if the pool encryption key for one server pool is compromised, that pool encryption key cannot be used to decrypt data handled by other server pools. In addition, staggering the expiration times of pool encryption keys provides resiliency by ensuring that the pool encryption keys do not expire across all server pools at the same time when key rotation fails and enables such a failure to be remedied before the pool encryption keys do all expire.

In some embodiments, the client application 102 does not maintain the expiration times of session tickets. In such cases, the client application 102 may attempt to establish a connection with a server using a session ticket without checking or knowing whether the session ticket has expired. If the session ticket has in fact expired, then the server will require a new secure communication session to be established via a full handshake and provide to the client application 102 an updated session ticket associated with the new session.

Figure 4:
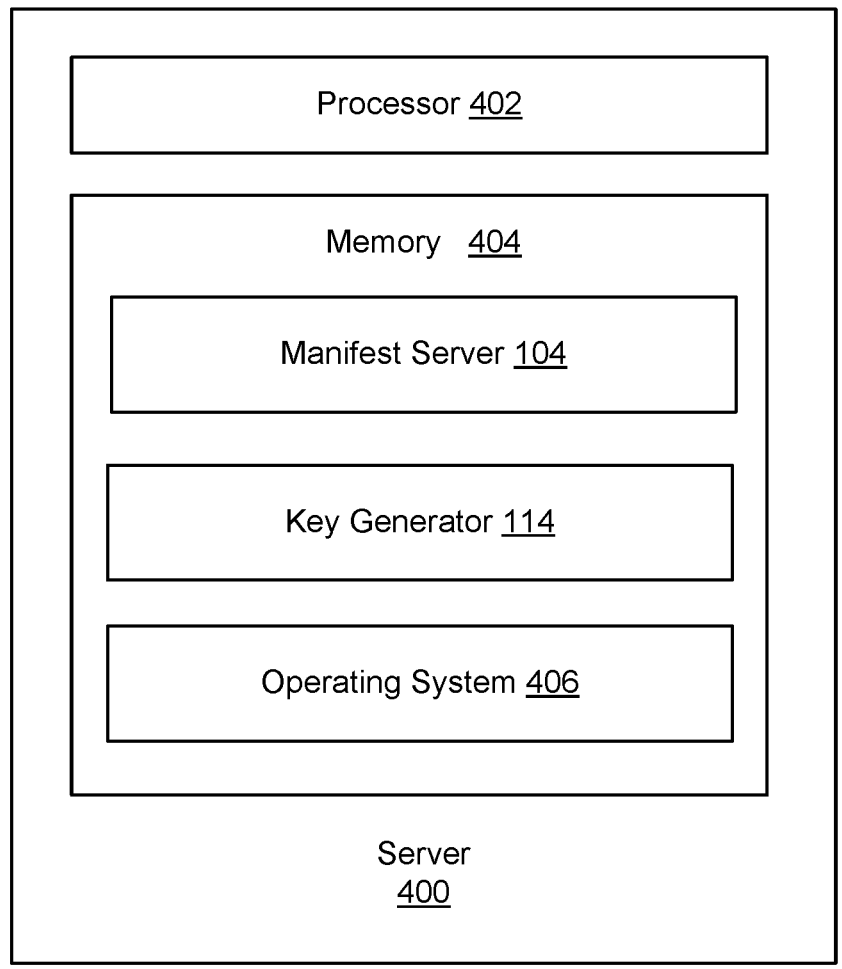
FIG. 4 is a conceptual illustration of a server machine in which the manifest server of FIG. 1 is implemented, according to various embodiments.

FIG. 4 is a conceptual illustration of a server machine in which the manifest server 104 and key generator 114 of FIG. 1 are implemented, according to various embodiments. Although described herein with respect to the server 400, it should be understood that the manifest server 104 can generally run on any technically feasible computing device that is connected to a network, such as the Internet. As shown, the server 400 includes, without limitation, a processor 402 and a memory 404. The processor 402 may be any instruction execution system, apparatus, or device capable of executing instructions. For example, the processor 402 could comprise a central processing unit (CPU), a graphics processing unit (GPU), a controller, a microcontroller, a state machine, or any combination thereof. The memory 404 stores content, such as software applications and data, for use by the processor 402.

The memory 404 may be one or more of a readily available memory, such as random access memory (RAM), read only memory (ROM), floppy disk, hard disk, or any other form of digital storage, local or remote. In some embodiments, a storage (not shown) may supplement or replace the memory 404. The storage may include any number and type of external memories that are accessible to the processor 402. For example, and without limitation, the storage may include a Secure Digital Card, an external Flash memory, a portable compact disc read-only memory (CD-ROM), an optical storage device, a magnetic storage device, or any suitable combination of the foregoing.

As shown, the memory 404 stores the manifest server 104, the key generator 114, and an operating system 406 on which the manifest server 104 and the key generator 114 run. The operating system 306 may be, e.g., Linux®, Microsoft Windows®, or Android™. The manifest server 104 and the key generator 114 may be a service, application, or other type of software that runs on the operating system 406. For example, in some embodiments, the manifest server 104 and the key generator 114 may be microservices in a video streaming service (or other type of service) having a microservice architecture. Further, functionality of the manifest server 104 and the key generator 114 may be distributed across multiple pieces of software in some embodiments. In addition, although shown as running on the same server 400, the manifest server 104 and the key generator 114 may run on different computing devices in other embodiments.

In some embodiments, the key generator 114 generates and distributes pool encryption keys for content server pools. As described, different pool encryption keys can be generated for different server pools so that, even if the pool encryption key for one server pool is compromised, that pool encryption key cannot be used to decrypt data handled by other server pools. Each of the pool encryption keys is associated with (1) a first time period during which the pool encryption key can be used to encrypt and decrypt session keys, and (2) a longer time period during which the pool encryption key can be used only to decrypt (but not to encrypt) session keys. For example, a pool encryption key could be valid for encryption and decryption for 24 hours, and only for decryption for 48 hours. In some embodiments, each pool encryption key associated with a server pool is assigned a first timestamp when the pool encryption key can start being used for encryption and decryption, allowing the pool encryption key to be pre-staged in advance of use, and a second timestamp when the pool encryption key expires and can no longer be used for decryption. In such cases, the end of the first time period, after which the pool encryption key can no longer be used to encrypt session keys but can still be used to decrypt session keys, is implied if another pool encryption key is available with a valid first timestamp for starting encryption and decryption. In addition, the expiration time of the pool encryption key ensures that, even if a malicious actor obtains a pool encryption key, that pool encryption key can only be used to decrypt session tickets for a limited period of time (e.g., 48 hours). In some embodiments, a waterfall scheme is used to stagger the expiration times of pool encryption keys. For example, after a pool encryption key is no longer valid for encryption after a 24-hour period, but while the pool encryption key is still valid for decryption, a next pool encryption key could be valid for encryption. In some embodiments, the pool key expiration times also differ across server pools, which can provide resiliency by ensuring that pool encryption keys do not all expire at the same time if key rotation fails. Returning to the example above, the 24-hour period during which a pool encryption key for one server pool can be used to encrypt session keys to generate session tickets and decrypt those session tickets could last from midnight of one day to midnight of the next day, while the 24-hour period during which a pool encryption key for another server pool can be used to encrypt session keys to generate session tickets and decrypt those session tickets could last from thirty minutes past midnight of one day to thirty minutes past midnight of the next day, etc.

In some embodiments, the manifest server 104 stores information indicating which content server(s) 106 and/or 110 the client application 102 should communicate with in order to access various content data stored on the content servers 106 and/or 110. In response to a request from the client application 102 for information relating to content servers from which particular content can be accessed, the manifest server transmits, to the client application 102, information specifying (1) addresses associated with the content servers from which data for the particular content can be accessed, and (2) associated content server pools, as discussed in greater detail below in conjunction with FIG. 7.

Figure 5:
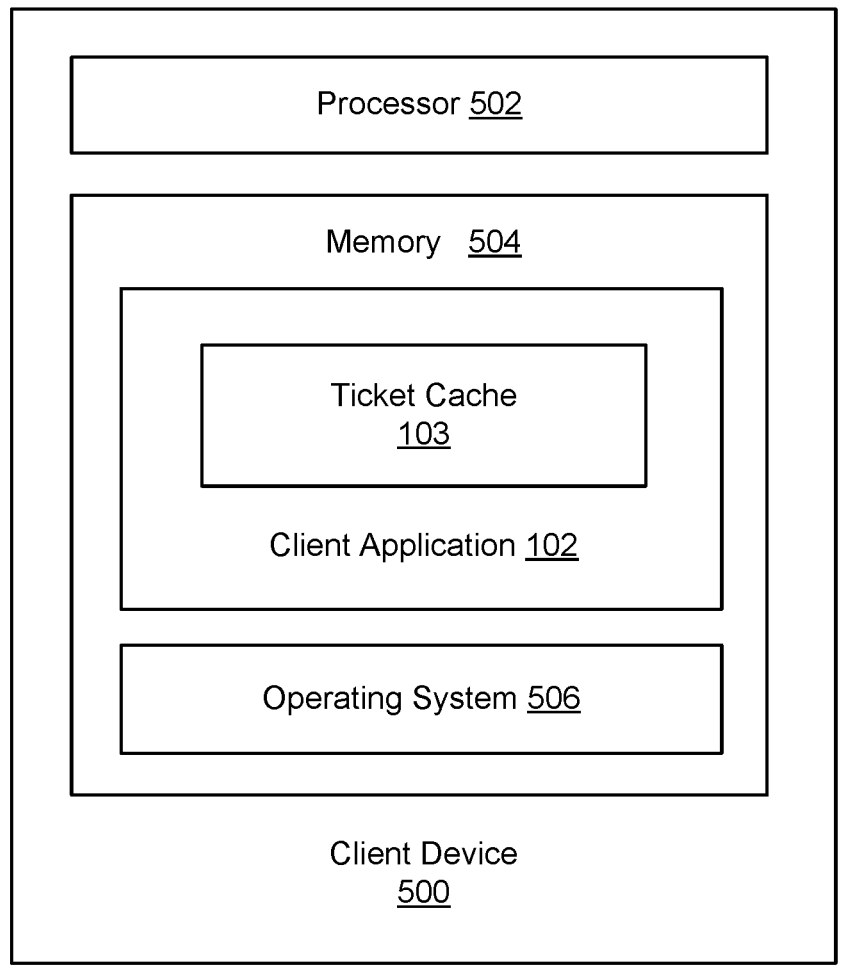
FIG. 5 is a conceptual illustration of a client device in which the client application of FIG. 1 is implemented, according to various embodiments.

FIG. 5 is a conceptual illustration of a client device 500 in which the client application 102 of FIG. 1 is implemented, according to various embodiments. Although described herein with respect to the client device 500, it should be understood that the client application 102 can generally run on any type of computing device that is connected to a network, such as the Internet. As shown, the client device 500 includes a processor 502 and a memory 504, which may perform similar functionalities as the processor 402 and the memory 404, respectively, of the server 400 described above in conjunction with FIG. 4. In some embodiments, a storage (not shown) may supplement or replace the memory 504.

As shown, the memory 504 stores the client application 102 and an operating system 506, which is similar to the operating system 406 described above in conjunction with FIG. 4. In some embodiments, the client application 102 receives manifests including addresses of content servers 106 and/or 110, from which data relating to particular content can be accessed, as well as information specifying server pools to which the content servers 106 and/or 110 belong. In alternative embodiments, information specifying server pools to which content servers 106 and/or 110 belong can be received in any other technically feasible manner, such as via DNS. In some embodiments, the server pools to which content servers 106 and/or 110 belong can also be inferred by the client application 102 itself, such as via a consistent hash. The client application 102 can use the addresses in the manifest to communicate with particular content servers 106 and/or 110. In addition, the client application 102 can use stored session tickets to restore sessions with content servers 106 and/or 110 belonging to the same server pools, as discussed in greater detail below in conjunction with FIG. 8. As shown, the client application 102 includes the ticket cache 103, which as described stores session tickets and associations between the session tickets and server pools.

Secure Communication Sessions with Server Pools

Figure 6:
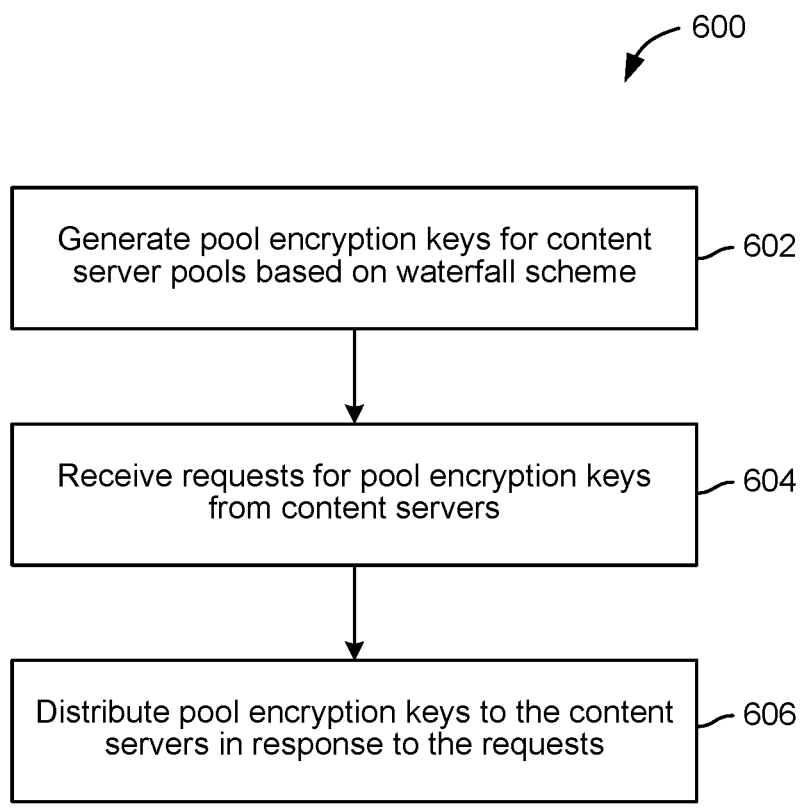
FIG. 6 is a flow diagram of method steps for generating and distributing pool encryption keys for generating session tickets, according to various embodiments.

FIG. 6 is a flow diagram of method steps for the key generator 114 to generate and distribute pool encryption keys for generating session tickets, according to various embodiments. Although the method steps are described with reference to the systems of FIGS. 1-4, persons skilled in the art will understand that any system configured to implement the method steps, in any order, falls within the scope of the present disclosure.

As shown, a method 600 begins at step 602, where the key generator 114 generates pool encryption keys for content server pools based on a waterfall scheme. As described, different pool encryption keys can be generated for different content server pools, and each of the pool encryption keys can be associated with a first time period during which the pool encryption key can be used to encrypt and decrypt session keys, as well as a longer time period during which the pool encryption key can be used only to decrypt session keys. Further, the waterfall scheme is used to stagger the time periods for server pools in, e.g., different geographical locations. As described, doing so can provide resiliency by ensuring that pool encryption keys do not expire across all content server pools at the same time so that some server pools are still accessible even if others become unavailable as a result of a failure during key rotation.

At step 604, the key generator 114 receives requests for pool encryption keys from the content servers 106 and 110. For example, the content servers 106 and 110 could request new pool encryption keys before previous pool encryption keys expire.

At step 606, the key generator 114 distributes the pool encryption keys to the content servers in response to the requests. The key generator 114 can also transmit information indicating the expiration times (and starting times) associated with the pool encryption keys, described above in conjunction with FIG. 4.

Figure 7:
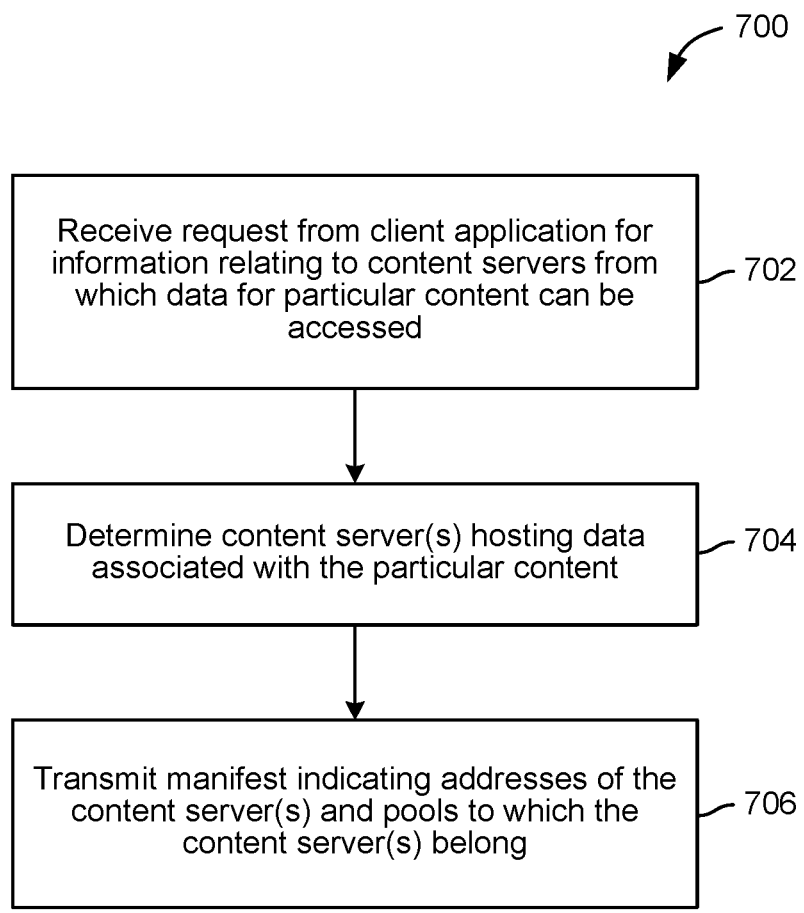
FIG. 7 is a flow diagram of method steps for generating and transmitting a manifest to a client application, according to various embodiments.

FIG. 7 is a flow diagram of method steps for the manifest server 104 to generate and transmit a manifest to the client application 102, according to various embodiments. Although the method steps are described with reference to the systems of FIGS. 1-4, persons skilled in the art will understand that any system configured to implement the method steps, in any order, falls within the scope of the present disclosure.

As shown, a method 700 begins at step 702, where the manifest server 104 receives a request from the client application 102 for information relating to content servers from which data for particular content can be accessed. As described, the client application 102 can make such a request in response to user input, or to identifying content that a user is likely to request via predictive technique(s).

At step 704, the manifest server 104 determines the information relating to the content server(s) 106 and/or 110 hosting data associated with the particular content. As described, the manifest server 104 stores information indicating which content servers 106 can be used to access data, such as video, audio, subtitles, etc. for content, such as a streaming video. In turn, the manifest server 104 can determine the addresses of content server(s), e.g., web addresses and/or IP addresses, and the associated server pool(s), e.g., ID(s) of such server pool(s), that provide access to data associated with particular content.

At step 706, the manifest server 104 transmits, to the client application 102, a manifest indicating addresses of the content server(s) and server pools to which the content server(s) belong. As described, the manifest can include information relating to the content server(s) determined at step 704, including the addresses of those content server(s) and associated server pool ID(s). Although described herein primarily with respect to the manifest server 104 transmitting information indicating the server pools to which content servers belong, in other embodiments, such information can be transmitted to the client application 102 in any technically feasible manner, such as via DNS, or be inferred by the client application 102 itself.

Figure 8:
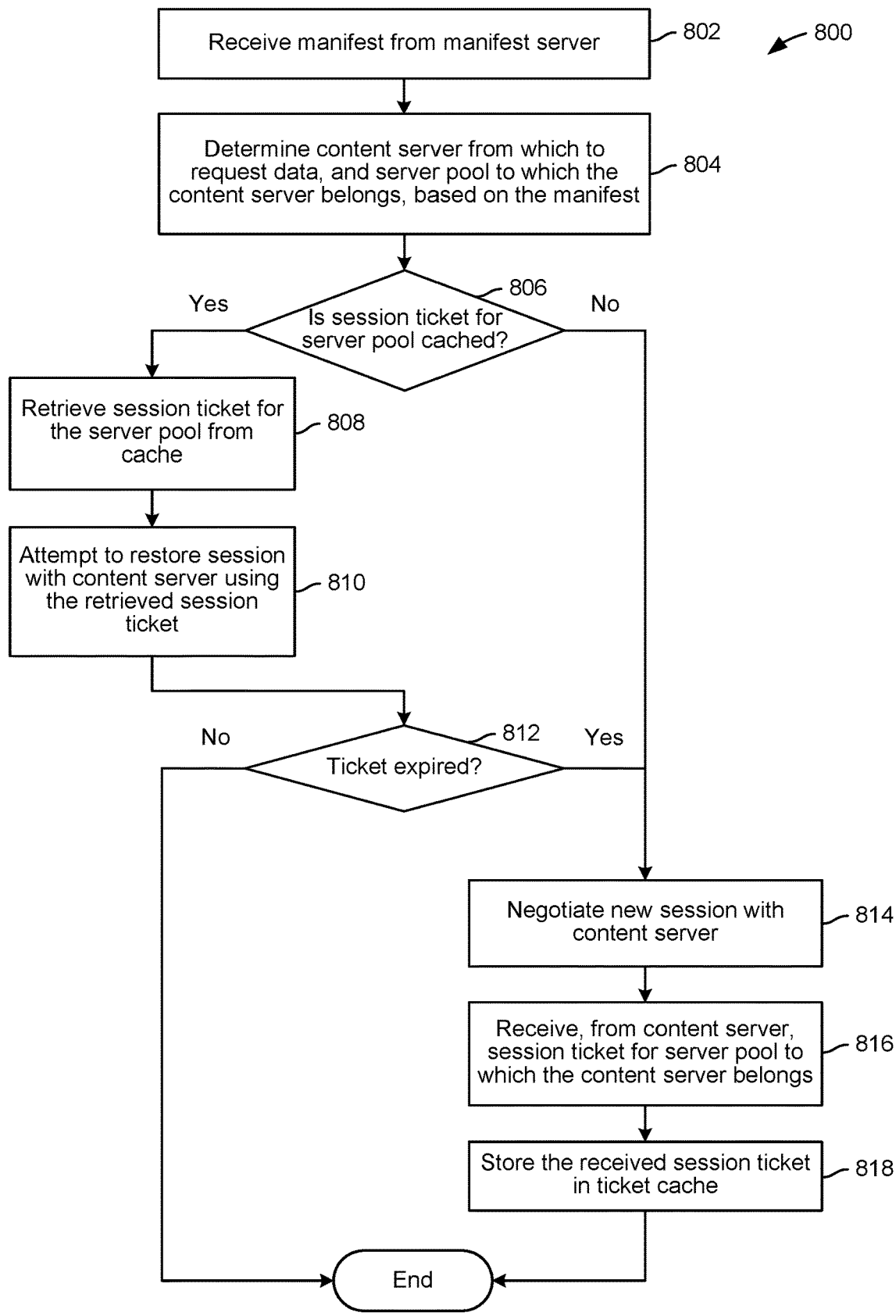
FIG. 8 is a flow diagram of method steps for a client application to communicate with a content server, according to various embodiments.

FIG. 8 is a flow diagram of method steps for the client application 102 to communicate with one of the content servers 106 or 110, according to various embodiments. Although the method steps are described with reference to the systems of FIGS. 1-3 and 5, persons skilled in the art will understand that any system configured to implement the method steps, in any order, falls within the scope of the present disclosure.

As shown, a method 800 begins at step 802, where the client application 102 receives a manifest from the manifest server 104. In some embodiments, the received manifest is the manifest transmitted by the manifest server 104 at step 706, described above in conjunction with FIG. 7. As described, such a manifest includes information relating to the content server(s), including addresses of the content server(s) and server pool(s) to which the content server(s) belong. In alternative embodiments, information indicating server pool(s) to which content server(s) can be received by the client application 102 in other ways, such as via DNS, or inferred by the client application 102 itself.

At step 804, the client application 102 determines a content server 106 or 110 from which to request data, and a server pool to which the content server 106 or 110 belongs, based on the manifest. Although described with respect to a single content server for simplicity, it should be understood that steps 804 through 818 of the method 800 can be repeated by the client application 102 any number of times to communicate with different content servers.

At step 806, the client application 102 determines whether a session ticket for the server pool is cached. As described, the client application 102 store can session tickets for different content server pools in the ticket cache 103, with the pool ID being used as a key into the ticket cache 103.

If a session ticket for the server pool is cached, then at step 808, the client application 102 retrieves the session ticket for the server pool from the ticket cache 103. Thereafter, at step 810, the client application 102 attempts to restore a session with the content server 106 or 110 using the retrieved session ticket. If the session is successfully restored, then the client application 102 can access content data hosted by the content server 106 or 110.

On the other hand, if the client application 102 determines at step 806 that a session ticket for the server pool is not cached, or if the client application 102 receives, at step 812, a notification from the content server 106 or 110 that the cached session ticket for the server pool has expired, then, at step 814, the client application 102 negotiates a new session with the content server 106 or 110. The negotiation can include performing a handshake according to a secure communication protocol, such as TLS. After establishing the new session, the client application 102 can access content data hosted by the content server 106 or 110.

At step 816, the client application 102 further receives, from the content server 106 or 110, a session ticket for the server pool to which the content server belongs. It should be understood that the content application 102 knows which server pool the content server 106 or 110 belongs to, as such information is indicated in the manifest received from the manifest server 104 (or received in another manner such as via DNS or inferred by the client application 102 itself).

Then, at step 818, the client application 102 stores the session ticket for the server pool in the ticket cache 103. As described, the session ticket can thereafter be retrieved from the ticket cache 103 and used to restore the session with the same content server 106 or 110 again or with other content server(s) belonging to the same server pool.

At least one technical advantage of the disclosed techniques relative to the prior art is that multiple handshakes are not required to establish secure communication sessions with servers in a server pool. As a result, the computational expense and time generally associated with handshakes can be avoided when accessing content stored across a server pool. Further, different server pools can use different shared encryption keys so that, even if the shared encryption key for one server pool is compromised, the compromised shared encryption key cannot be used to decrypt data handled by other server pools. In addition, the servers in different server pools can use shared encryption keys having different expiration times, which provides resiliency by ensuring that shared encryption keys do not expire across all server pools at the same time in cases when key rotation fails and enables the failure to be remedied before the shared encryption keys do all expire. These technical advantages represent one or more technological advancements over prior art approaches.

1. In some embodiments, a computer-implemented method for sharing secure communication sessions within a computer network comprises receiving a first ticket from a first server that is included in a first server pool and with which a first secure communication session has been established, receiving information indicating that a second server also is included in the first server pool and is associated with a first address, establishing a connection with the second server based on the first address, and restoring the first secure communication session with the second server based on the first ticket.

2. The computer-implemented method of clause 1, further comprising storing the first ticket and an association between the first server pool and the first ticket in a cache, wherein restoring the first secure communication session with the second server comprises retrieving the first ticket stored in the cache, and transmitting the first ticket to the second server.

3. The computer-implemented method of clauses 1 or 2, further comprising performing a handshake with the second server if the first ticket has expired.

4. The computer-implemented method of any of clauses 1-3, wherein the first ticket is generated using a first encryption key shared by servers included in the first server pool, and the first encryption key can be used to encrypt and decrypt session keys during a first period of time and to only decrypt session keys during a second period of time.

5. The computer-implemented method of any of clauses 1-4, further comprising receiving a second ticket from the first server to be used during the second period of time, wherein the second ticket is generated using a second encryption key shared by the servers included in the first server pool.

6. The computer-implemented method of any of clauses 1-5, further comprising receiving information indicating that a third server is included in a second server pool and a second address associated with the third server, establishing a connection with the third server based on the second address, and establishing a second secure communication session with the third server, wherein establishing the second secure communication session comprises performing a handshake with the third server.

7. The computer-implemented method of any of clauses 1-6, wherein the first secure communication session and the second secure communication session comprise Transport Layer Security (TLS) sessions, and the first ticket comprises a TLS ticket.

8. The computer-implemented method of any of clauses 1-7, wherein the first address comprises a uniform resource locator (URL), and the information indicates an identifier (ID) of the first server pool.

9. In some embodiments, a computer-implemented method comprises storing associations between servers and server pools, wherein servers in each server pool share an encryption key that is used to encrypt session keys, and transmitting, to a client application, information indicating an address of a first server from which content can be accessed and a first server pool associated with the first server.

10. The computer-implemented method of clause 9, further comprising determining the first server based on a request from the client application.

11. The computer-implemented method of clauses 9 or 10, wherein the first server is identified by the client application based on a predictive technique.

12. The computer-implemented method of any of clauses 9-11, wherein the encryption keys are generated by a key generator and distributed to the servers in each server pool.

13. The computer-implemented method of any of clauses 9-12, wherein a first encryption key shared by servers in the first server pool has a different expiration time than a second encryption key shared by servers in a second server pool.

14. The computer-implemented method of any of clauses 9-13, wherein the address comprises a uniform resource locator (URL), and the information indicates an identifier (ID) of the first server pool.

15. The computer-implemented method of any of clauses 9-14, wherein the client application is a web browser.

16. The computer-implemented method of any of clauses 9-15, wherein the client application is a streaming video application.

17. In some embodiments, a system comprises a memory storing a client application, and a processor that is coupled to the memory and, when executing the client application, is configured to perform the steps of receiving a ticket from a first server that is included in a server pool and with which a secure communication session has been established, receiving information indicating that a second server also is included in the server pool and is associated with an address, establishing a connection with the second server based on the address, and restoring the secure communication session with the second server based on the ticket.

18. The system of clause 17, the steps further comprising storing the ticket and an association between the server pool and the ticket in a cache, wherein restoring the secure communication session with the second server comprises retrieving the ticket stored in the cache, and transmitting the ticket to the second server.

19. The system of clauses 17 or 18, the steps further comprising performing a handshake with the second server if the ticket has expired.

20. The system of any of clauses 17-19, wherein the secure communication session is a Transport Layer Security (TLS) session.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for sharing secure communication sessions within a computer network, the method comprising:
   receiving a first ticket from a first server that is included in a first server pool and with which a first secure communication session has been established, wherein the first ticket is generated by the first server encrypting a first session key using a first shared encryption key, wherein the first shared encryption key is used by a first plurality of servers included in the first server pool at a first time to encrypt and decrypt one or more session keys, and wherein a second ticket is generated by encrypting a second session key using a second shared encryption key that is used by a second plurality of servers included in a second server pool at the first time to encrypt and decrypt one or more other session keys, and the second ticket is used to establish and restore a second secure communication session with one or more servers included in the second plurality of servers;
   receiving information indicating that a different server also is included in the first plurality of servers and is associated with a first address;
   establishing a connection with the different server based on the first address; and
   restoring the first secure communication session with the different server using the first ticket.

2. The computer-implemented method of claim 1, further comprising storing the first ticket and an association between the first server pool and the first ticket in a cache, wherein restoring the first secure communication session with the different server comprises retrieving the first ticket stored in the cache, and transmitting the first ticket to the different server based on the association.

3. The computer-implemented method of claim 1, further comprising performing a handshake with the different server if the first ticket has expired.

4. The computer-implemented method of claim 1, wherein the first shared encryption key can be used to encrypt and decrypt session keys during a first period of time and to only decrypt session keys during a second period of time that is after the first period of time.

5. The computer-implemented method of claim 4, further comprising receiving a third ticket from the first server to be used during the second period of time, wherein the third ticket is generated using a third shared encryption key that is used by the first plurality of servers included in the first server pool.

6. The computer-implemented method of claim 1, further comprising:
   receiving information indicating that a third server is included in the second server pool and a second address associated with the third server;
   establishing a connection with the third server based on the second address; and
   establishing the second secure communication session with the third server, wherein establishing the second secure communication session comprises performing a handshake with the third server.

7. The computer-implemented method of claim 6, wherein the first secure communication session and the second secure communication session comprise Transport Layer Security (TLS) sessions, and the first ticket comprises a TLS ticket.

8. The computer-implemented method of claim 1, wherein the first address comprises a uniform resource locator (URL), and the information indicates an identifier (ID) of the first server pool.

9. A computer-implemented method comprising:
   storing associations between servers and server pools, wherein a first plurality of servers in a first server pool uses a first shared encryption key at a first time to encrypt and decrypt a first session key to generate a first ticket that is used to establish and restore a first secure communication session with one or more servers included in the first plurality of servers, and a second plurality of servers in a second server pool uses a second shared encryption key at the first time to encrypt and decrypt a second session key to generate a second ticket that is used to establish and restore a second secure communication session with one or more servers included in the second plurality of servers; and
   transmitting, to a client application, information indicating an address of a first server included in the first plurality of servers from which content can be accessed and indicating a first association between the first server pool and the first server,
   wherein the client application causes the first ticket to be stored and can use the first ticket to establish the first secure communication session with the first server, and the client application can use the first ticket to restore the first secure communication session with a different server included in the first plurality of servers based on the first association.

10. The computer-implemented method of claim 9, further comprising determining the first server based on a request from the client application.

11. The computer-implemented method of claim 9, wherein the first server is identified by the client application based on a predictive technique.

12. The computer-implemented method of claim 9, wherein the first and second shared encryption keys are generated by a key generator and distributed to the servers in the first and second server pools.

13. The computer-implemented method of claim 9, wherein the first shared encryption key used by the first plurality of servers in the first server pool has a different expiration time than the second shared encryption key used by the second plurality of servers in the second server pool.

14. The computer-implemented method of claim 9, wherein the address comprises a uniform resource locator (URL), and the information indicates an identifier (ID) of the first server pool.

15. The computer-implemented method of claim 9, wherein the client application is a web browser.

16. The computer-implemented method of claim 9, wherein the client application is a streaming video application.

17. A system, comprising:
one or more memories storing a client application; and
one or more processors that are coupled to the one or more memories and,
when executing the client application, are configured to perform the steps of:
receiving a first ticket from a first server that is included in a first server pool and with which a first secure communication session has been established, wherein the first ticket is generated by the first server encrypting a first session key using a first shared encryption key, wherein the first shared encryption key is used by a first plurality of servers included in the first server pool at a first time to encrypt and decrypt one or more session keys, and wherein a second ticket is generated by encrypting a second session key using a second shared encryption key that is used by a second plurality of servers included in a second server pool at the first time to encrypt and decrypt one or more other session keys, and the second ticket is used to establish and restore a second secure communication session with one or more servers included in the second plurality of servers,
receiving information indicating that a different server also is included in the first plurality of servers and is associated with a first address,
establishing a connection with the different server based on the first address, and
restoring the secure communication session with the different server using the first ticket.

18. The system of claim 17, the steps further comprising storing the first ticket and an association between the first server pool and the first ticket in a cache, wherein restoring the first secure communication session with the different server comprises retrieving the first ticket stored in the cache, and transmitting the first ticket to the different server based on the association.

19. The system of claim 17, the steps further comprising performing a handshake with the different server if the first ticket has expired.

20. The system of claim 17, wherein the first secure communication session is a Transport Layer Security (TLS) session.

* * * * *